(12) United States Patent
Medioni et al.

(10) Patent No.: US 9,940,727 B2
(45) Date of Patent: Apr. 10, 2018

(54) THREE-DIMENSIONAL MODELING FROM WIDE BASELINE RANGE SCANS

(71) Applicants: Gerard Guy Medioni, Los Angeles, CA (US); Ruizhe Wang, Pasadena, CA (US); Jongmoo Choi, Gardena, CA (US)

(72) Inventors: Gerard Guy Medioni, Los Angeles, CA (US); Ruizhe Wang, Pasadena, CA (US); Jongmoo Choi, Gardena, CA (US)

(73) Assignee: University of Southern California, Los Angeles, CA (US)

( * ) Notice: Subject to any disclaimer, the term of this patent is extended or adjusted under 35 U.S.C. 154(b) by 173 days.

(21) Appl. No.: 14/745,264

(22) Filed: Jun. 19, 2015

(65) Prior Publication Data
US 2015/0371432 A1    Dec. 24, 2015

Related U.S. Application Data

(60) Provisional application No. 62/014,494, filed on Jun. 19, 2014.

(51) Int. Cl.
*G01B 11/245* (2006.01)
*G06T 7/33* (2017.01)
*G06T 7/73* (2017.01)

(52) U.S. Cl.
CPC .............. *G06T 7/33* (2017.01); *G01B 11/245* (2013.01); *G06T 7/73* (2017.01);
(Continued)

(58) Field of Classification Search
CPC .. G06T 7/73; G06T 7/174; G06T 7/33; G06T 2207/30244; G06T 2207/30196; G06T 2207/10028; G01B 11/245
See application file for complete search history.

(56) References Cited

U.S. PATENT DOCUMENTS

| 7,224,357 B2 | 5/2007 | Chen et al. |
| 7,583,275 B2 | 9/2009 | Newmann et al. |

(Continued)

OTHER PUBLICATIONS

'bodymetrics.com' [online]. "Bodymap the World," 2015, [retrieved on Sep. 23, 2015]. Retrieved from the Internet: URL<http://www.bodymetrics.com/>. 4 pages.
(Continued)

*Primary Examiner* — Mark Zimmerman
*Assistant Examiner* — Nurun N Flora
(74) *Attorney, Agent, or Firm* — Fish & Richardson P.C.

(57) ABSTRACT

The present disclosure describes systems and techniques relating to generating three dimensional (3D) models from range sensor data. According to an aspect, frames of range scan data captured using one or more three dimensional (3D) sensors are obtained, where the frames correspond to different views of an object or scene; point clouds for the frames are registered with each other by maximizing coherence of projected occluding boundaries of the object or scene within the frames using an optimization algorithm with a cost function that computes pairwise or global contour correspondences; and the registered point clouds are provided for use in 3D modeling of the object or scene. Further, the cost function, which maximizing contour coherence, can be used with more than two point clouds for more than two frames at a time in a global optimization framework.

20 Claims, 5 Drawing Sheets

Fig. 1A

(52) U.S. Cl.
CPC ............... *G06T 2207/10028* (2013.01); *G06T 2207/30196* (2013.01); *G06T 2207/30244* (2013.01)

(56) References Cited

U.S. PATENT DOCUMENTS

| | | | |
|---|---|---|---|
| 7,856,125 | B2 | 12/2010 | Medioni et al. |
| 8,401,276 | B1* | 3/2013 | Choe ............... G01C 11/06 345/419 |
| 2002/0191818 | A1 | 12/2002 | Matsuo |
| 2004/0027347 | A1 | 2/2004 | Farsaie |
| 2004/0151365 | A1* | 8/2004 | An Chang ........... G06K 9/2036 382/154 |
| 2005/0243323 | A1* | 11/2005 | Hsu ................... G06K 9/3241 356/450 |
| 2007/0031064 | A1 | 2/2007 | Zhao et al. |
| 2007/0183651 | A1 | 8/2007 | Comaniciu et al. |
| 2008/0031512 | A1 | 2/2008 | Mundermann et al. |
| 2008/0075326 | A1 | 3/2008 | Otani et al. |
| 2008/0246759 | A1 | 10/2008 | Summers |
| 2010/0098328 | A1 | 4/2010 | Se et al. |
| 2010/0111370 | A1 | 5/2010 | Black et al. |
| 2011/0267344 | A1 | 11/2011 | Germann et al. |
| 2011/0304619 | A1 | 12/2011 | Fu et al. |
| 2013/0187919 | A1 | 7/2013 | Medioni et al. |
| 2013/0286012 | A1 | 10/2013 | Medioni |

OTHER PUBLICATIONS

'www.sizestream.com' [online]. 2015, [retrieved on Sep. 23, 2015]. Retrieved from the Internet: URL<http://www.sizestream.com/>. 3 pages.

'www.styku.com' [online]. "Styku: 3D body scanning and shape analysis for Fitness, Health, Apparel, and more," 2015, [retrieved on Sep. 23, 2015]. Retrieved from the Internet: URL<http://www.styku.com/business/>. 13 pages.

'www.tc2.com' [online]. "Driving the Future of the Fashion Industry," 2014, [retrieved on Sep. 23, 2015]. Retrieved from the Internet: URL<http://www.tc2.com/>. 3 pages.

Allen et al., "Articulated body deformation from range scan data," TOG, ACM, 2002, 21:612-619.

Chang and Zwicker "Automatic registration for articulated shapes," Computer Graphics Forum, 2008, 27(5):1459-1468.

Chen and Medioni, "Object Modeling by Registration of Multiple Range Images," 1991 IEEE International Conference on Robotics and Automation, 3:2724-2729.

Chetverikov et al., "Robust Euclidean alignment of 3d point sets: the trimmed iterative closest point algorithm," Image and Vision Computing, 2005, 23(3):299-309.

Cheung et al., "Shape-from-silhouette of articulated objects and its use for human body kinematics estimation and motion capture," CVPR, 2003, vol. 1, pp. I-77.

Cheung et al., "Visual hull alignment and refinement across time: A 3d reconstruction algorithm combining shape-from-silhouette with stereo," VPR, 2003, vol. 2, pp. II-375.

Cipolla and Blake, "Surface shape from the deformation of apparent contours," IJCV, 1992, 9(2):83-112.

Cipolla et al., "Motion from the frontier of curved surfaces," ICCV, 1995, pp. 269-275.

Cui et al., "KinectAvatar: Fully Automatic Body Capture Using a Single Kinect," ACCV Workshop on Color Depth Fusion in Computer Vision, 2012, 14 pages.

Curless and Levoy, "A Volumetric Method for Building Complex Models from Range Images," Proc. SIGGRAPH, 1996, 10 pages.

Fischler and Bolles, "Random sample consensus: a paradigm for model fitting with applications to image analysis and automated cartography," Communications of the ACM, Jun. 1981, 24(6):381-395.

Gelfand et al., "Robust global registration," Eurographics Symposium on Geometry Processing, 2005, 2:5.

Hernandez et al., "Silhouette coherence for camera calibration under circular motion," TPAMI, 2007, 29(2):343-349.

Izadi et al., "KinectFusion: Real-time 3D Reconstruction and Interaction Using a Moving Depth Camera," ACM Symposium on User Interface Software and Technology, Oct. 2011, 10 pages.

Kazhdan et al., "Poisson surface reconstruction," Eurographics Symposium on Geometry Processing, 2006, 10 pages.

Li et al., "Robust single-view geometry and motion reconstruction," ACM Transactions on Graphics (TOG) 28.5 (2009): 175 (10 pages).

Li et al., "3D self-portraits," ACM Transactions on Graphics (Proceedings SIGGRAPH Asia 2013), Nov. 2013, 32(6).

Li et al., "Global correspondence optimization for non-rigid registration of depth scans," Eurographics Symposium on Geometry Processing, 2008, 27(5):1421-1430.

Liao et al., "Modeling deformable objects from a single depth camera," Computer Vision, 12th International Conference on. IEEE, 2009, 8 pages.

Mendonca et al., "Epipolar geometry from profiles under circular motion," TPAMI, Feb. 2001, 23(6):604-616.

Microsoft Kinect Project, "Communicate with Computers Naturally," retrieved from the Internet on May 23, 2013, http://research.microsoft.com/en-us/um/redmond/projects/kinectsdk 1 page.

Moré, "The levenberg-marquardt algorithm: implementation and theory," Numerical Analysis, 1978, pp. 105-116.

Newcombe and Davison, "Live Dense Reconstruction with a Single Moving Camera," CVPR, 2010, 8 pages.

Newcombe et al., "Kinectfusion: Real-time dense surface mapping and tracking," IEEE International Symposium on Mixed and Augmented Reality, Oct. 2011, pp. 127-136.

OpenNI, "What is OpenNI?", retrieved from the Internet on May 23, 2013, http://www.openni.org/ 5 pages.

Paris et al., "Bilateral Filtering: Theory and Applications," Foundations and Trends in Computer Graphics and Vision, 2008, 4(1):1-73.

Pekelny and Gotsman, "Articulated object reconstruction and markerless motion capture from depth video," Eurographics, 2008, 27(2):399-408.

Rusinkiewicz and Levoy, "Efficient variants of the ICP algorithm," IEEE Third International Conference on 3-D Digital Imaging and Modeling, 2001, pp. 145-152.

Shotton et al., "Real-time human pose recognition in parts from single depth images," Communications of the ACM 56.1, 2013, pp. 116-124.

Siddiqui and Medioni, "Human pose estimation from a single view point, real-time range sensor," Computer Vision and Pattern Recognition Workshops, 2010, pp. 1-8.

Silva et al., "Precision range image registration using a robust surface interpenetration measure and enhanced genetic algorithms," TPAMI, May 2005, 27(5):762-776.

Tong et al., "Scanning 3D full human bodies using kinects," IEEE Transactions on Visualization and Computer Graphics, Apr. 2012, 18(4):643-650.

Weise et al., "Accurate and Robust Registration for In-hand Modeling," IEEE Conference on Computer Vision and Pattern Recognition, 2008, 8 pages.

Weiss et al., "Home 3D Body Scans from Noisy Image and Range Data," Int. Conf. on Computer Vision, ICCV, Nov. 2011, 8 pages.

Wong, "Structure and motion from silhouettes," ICCV, 2001, 2:217-222.

Zeng et al., "Templateless quasi-rigid shape modeling with implicit loop-closure," IEEE Conference on Computer Vision and Pattern Recognition, 2013, pp. 145-152.

\* cited by examiner

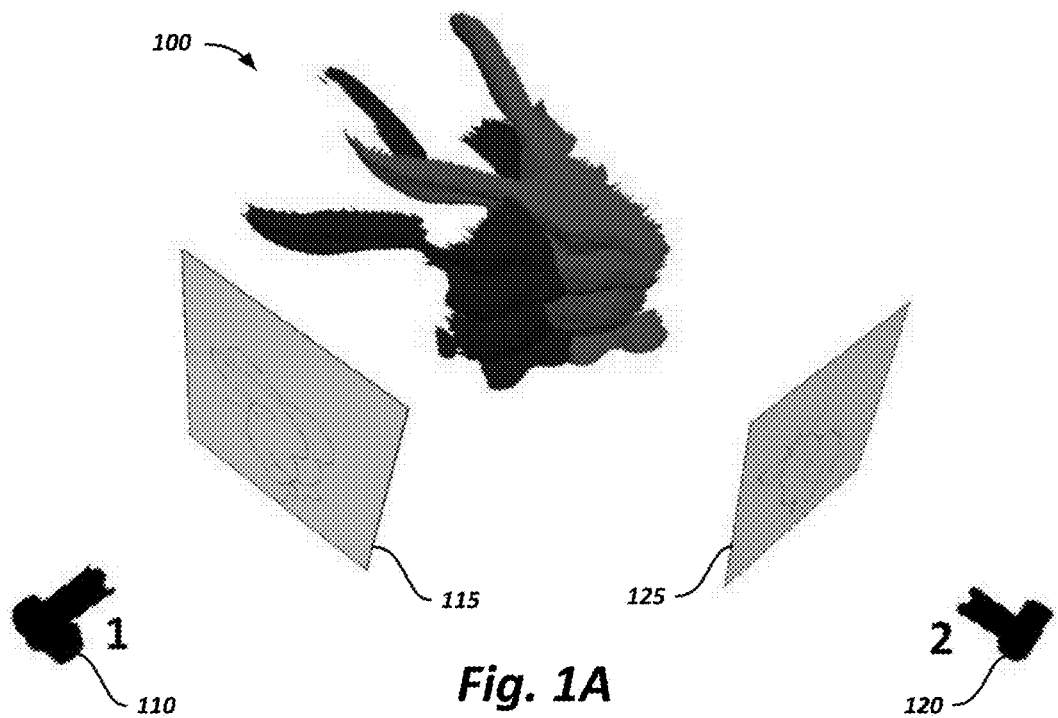
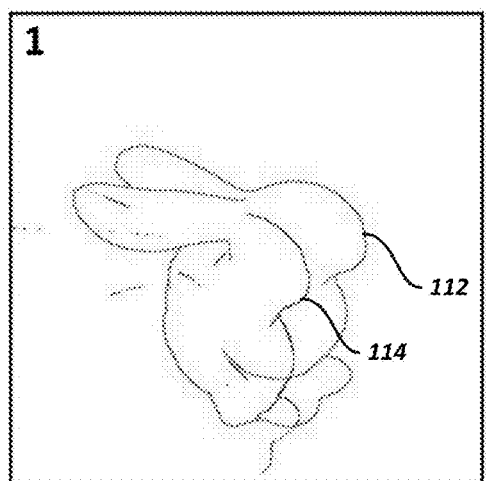 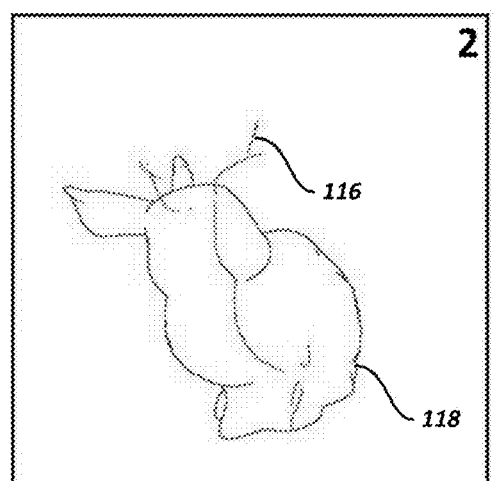
Fig. 1A
Fig. 1B
Fig. 1C

THREE-DIMENSIONAL MODELING FROM WIDE BASELINE RANGE SCANS

CROSS REFERENCE TO RELATED APPLICATIONS

This application claims priority to U.S. Provisional Application Ser. No. 62/014,494, entitled "THREE-DIMENSIONAL MODELING FROM WIDE BASELINE RANGE SCANS", filed Jun. 19, 2014, which is hereby incorporated by reference.

STATEMENT AS TO FEDERALLY SPONSORED RESEARCH

This invention was made with government support under Grant No. W911NF-04-D0005, awarded by Army Research Office (ARO). The government has certain rights in the invention.

BACKGROUND

The present disclosure describes systems and techniques relating to generating three dimensional (3D) models from range sensor data.

Registering two or more range scans is a fundamental problem, with application to 3D modeling. While this problem is well addressed by existing techniques such as ICP (Iterative Closest Point) when the views overlap significantly, no satisfactory solution exists for wide baseline registration. For rigid modeling, most prevailing methodologies either suggest using all consecutive frames from a single range sensor in an incremental manner or merge the range scans of multiple pre-calibrated range sensors. For articulated modeling, such as of the human body, the state-of-the-art methods typically require taking multiple frames, ranging from eight to as many as forty, of different viewpoints of the moving subject. All frames are first aligned in pairs, then registered globally, both in an articulated manner. All methods above require substantial amount of overlap among neighboring frames.

SUMMARY

The present disclosure describes systems and techniques relating to generating three dimensional (3D) models from range sensor data, which includes an approach to 3D modeling that leverages contour coherence and allows alignment of two wide baseline range scans with limited overlap. The contour coherence may be maximized by iteratively building robust corresponding pairs on apparent contours and minimizing their distances. The contour coherence may be used under a multi-view rigid registration framework, and this enables the reconstruction of accurate and complete 3D models from as few as four frames. Moreover, the systems and techniques can be further extended to handle articulations. After modeling with a few frames, in case higher accuracy is required, more frames can be readily added in a drift-free manner by a conventional registration method. Experimental results on both synthetic and real data demonstrate the effectiveness and robustness of the contour coherence-based registration approach to wide baseline range scans, and to 3D modeling.

In some implementations, a method performs registration by maximizing the contour coherence, instead of the shape coherence which is suggested by other the registration algorithms. As such, the error is minimized in the 2D image plane, instead of in the 3D coordinate system. This permits the registration of two wide baseline range scans with limited overlap. In some implementations, the method enables performance of global registration even from poorly initialized range scans, thus avoiding the need for pair-wise registration. Further, in some implementations, the method permits complete modeling of both rigid and articulated objects from as few as four range scans.

According to an aspect of the described systems and techniques, frames of range scan data captured using one or more three dimensional (3D) sensors are obtained, where the frames correspond to different views of an object or scene; point clouds for the frames are registered with each other by maximizing coherence of projected occluding boundaries of the object or scene within the frames using an optimization algorithm with a cost function that computes pairwise or global contour correspondences; and the registered point clouds are provided for use in 3D modeling of the object or scene, or for other processes and applications. The registering can include concurrently registering more than two different point clouds corresponding to the frames of range scan data, and the cost function can compute global contour correspondences for projections of the more than two different point clouds across two dimensional image planes of the frames. Thus, the cost function, which maximizing contour coherence, can be used simultaneously with multiple point clouds for multiple frames in a global optimization framework that registers all the point clouds of all the frames with each other at the same time.

According to another aspect of the described systems and techniques, frames of range scan data captured using one or more 3D sensors are obtained, where the frames correspond to different views of an object or scene; visibility pairings are generated for the frames, where a pairing of a first frame with a second frame indicates that (i) at least a portion of the object or scene represented in the second frame is visible in the first frame and (ii) at least a portion of the object or scene represented in the first frame is visible in the second frame; registration between frames in each of the visibility pairings is performed by maximizing contour coherence of the range scan data for the object or scene, including minimizing (i) distance between contour correspondences for the first frame and the second frame of the pairing in a first two dimensional image plane of the first frame and (ii) distance between contour correspondences for the second frame and the first frame of the pairing in a second two dimensional image plane of the second frame; and the visibility pairings for the frames are updated and the registration is repeated, iteratively, until convergence. According to additional aspects, various computer systems, and computer program products, encoded on computer-readable mediums, effect implementation of the algorithms described.

In various implementations, one or more of the following features and advantages can be provided. A modeling system can take only four range scans as input and still accurately register the data from the four range scans together for generation of a full 3D model of the scanned object or scene, hence greatly reducing both the data acquisition and processing complexity. The method can minimize the global error, and as such the modeling result is globally accurate. Moreover, in case higher accuracy is preferred, more frames can be readily added to the existing model in a drift-free manner.

The above and other aspects and embodiments are described in greater detail in the drawings, the description and the claims.

DESCRIPTION OF DRAWINGS

FIGS. 1A-1F show an example of registration of wide baseline range scans.

Like reference numbers and designations in the various drawings indicate like elements.

DETAILED DESCRIPTION

Registering two or more range scans is a fundamental problem, with application to three dimensional (3D) modeling. While this problem is well addressed by existing techniques such as Itterative Closest Point (ICP) algorithms when the views overlap significantly, no satisfactory solution exists for wide baseline registration. We propose here a novel approach which leverages contour coherence and allows us to align two wide baseline range scans with limited overlap including, potentially, from a poor initialization. We maximize the contour coherence by building robust corresponding pairs on apparent contours and minimizing their distances in an iterative fashion. The contour coherence can be used under a multi-view rigid registration framework, which enables the reconstruction of accurate and complete 3D models from as few as four frames. We further extend this technique to handle articulations. After modeling with a few frames, in case higher accuracy is required, more frames can be readily added in a drift-free manner by a conventional registration method. Experimental results on both synthetic and real data demonstrate the effectiveness and robustness of this contour coherence based registration approach to wide baseline range scans, and to 3D modeling.

Figure 1D:
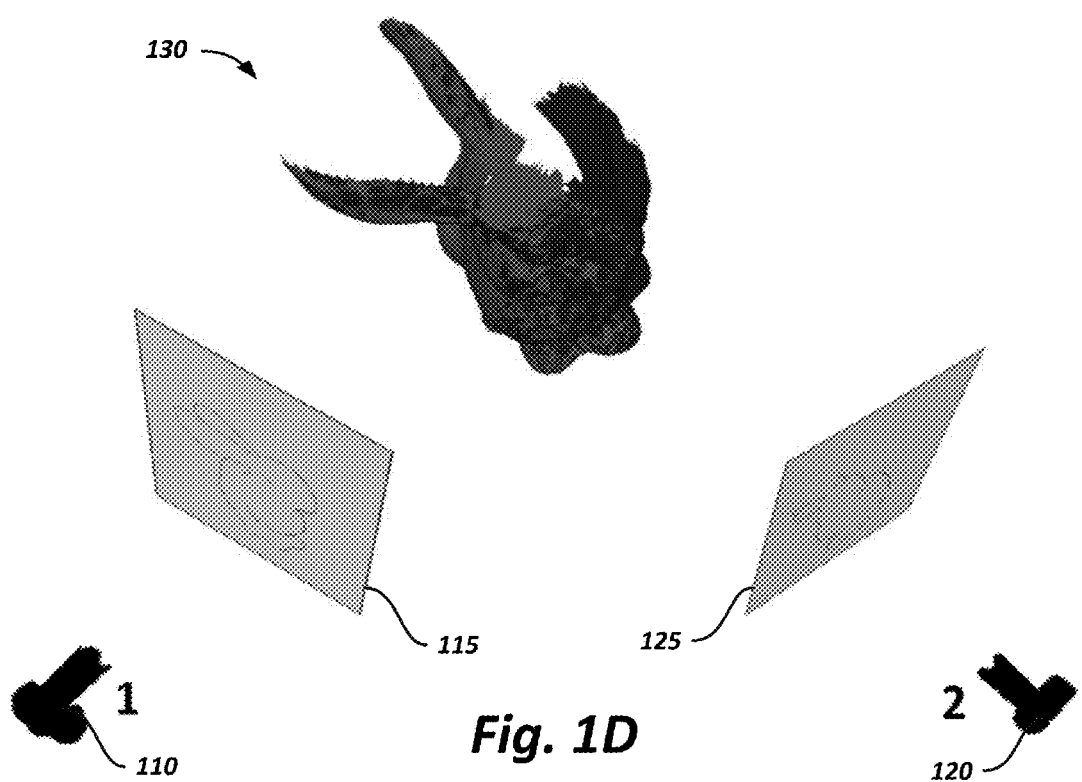

FIGS. 1A-1F show an example of registration of wide baseline range scans. Registering two wide baseline range scans presents a challenging task where two range scans barely overlap and the shape coherence no longer prevails. FIG. 1A shows an example 100 of two wide baseline range scans of the Stanford bunny with approximately 40% overlap. The traditional shape coherence based methods may fail for this example 100 as most closest-distance correspondences are incorrect.

In computer vision dealing with intensity images, a large body of work has been devoted to study the apparent contour, or simply contour. An apparent contour is the projection of a contour generator, which is defined as the set of points on the surface where the tangent plane contains the line of sight from the camera. This contour has been shown to be a rich source of geometric information for motion estimation and 3D reconstruction. Inspired by this work, we propose the concept of contour coherence for wide baseline range scan registration. Contour coherence is defined as the agreement between the observed apparent contour and the predicted apparent contour.

The example 100 in FIG. 1A shows a first meshed point cloud (in grey) generated from the range scan data from a first camera 110 (e.g., a 2.5D range scan from a PRIMESENSE™ camera or other device with a depth sensor) roughly aligned with a second meshed point cloud (in black) from the range scan data from a second camera 120 (e.g., a 2.5D range scan from a PRIMESENSE™ camera or other device with a depth sensor). Note that the description here and below refers to first and second cameras 110 and 120, but as will be appreciated, these may be the same device taking range scans of the object at two different times, between which times the object has moved (e.g., a person turning in front of a single depth image camera to generate frames of range scan data) or the camera has moved (e.g., the camera moves in an arc or circle around a person to generate frames of range scan data). Thus, the references to camera pose herein refer to the orientation of the camera with respect to the object, regardless of whether the object moves, the camera moves, there are more than one camera around the object, or a combination of these.

In FIG. 1A, the observed and predicted apparent contours are shown in both a first image plane 115 for camera-1 110 and a second image plane 125 for camera-2 120. FIG. 1B shows an expanded and straighton view of the first image plane 115 for camera-1. In FIG. 1B, the observed contours 112 extracted from the range scan data captured by camera-1 do not match the predicted contours 114 extracted from the projected range scan data captured by camera-2. Likewise, FIG. 1C shows an expanded and straighton view of the second image plane 125 for camera-2, in which the observed contours 118 extracted from the range scan data captured by camera-2 do not match the predicted contours 116 extracted from the projected range scan data captured by camera-1.

Figure 1E:
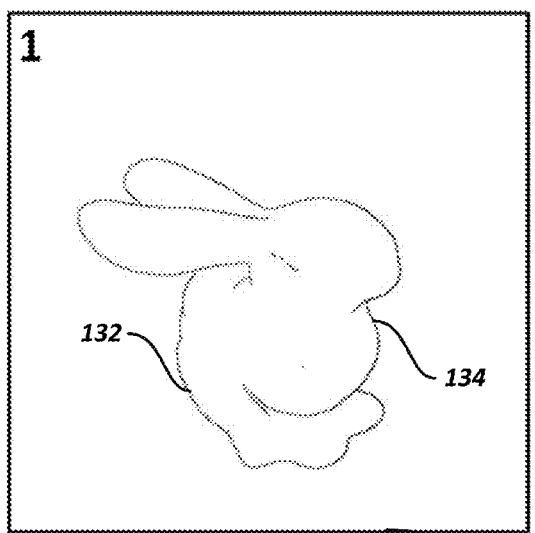
Figure 1F:
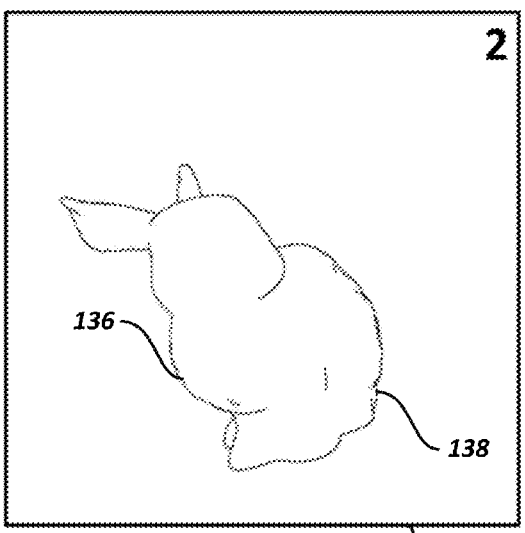

As described herein, the contour coherence (between the observed apparent contours 112 and the predicted apparent contours 114 in the first image plane 115, and between the observed apparent contours 118 and the predicted apparent contours 116 in the second image plane 125) can be maximized by iteratively building robust correspondences among apparent contours and minimizing their distances. FIG. 1D shows the registration result 130 with the contour coherence maximized and two wide baseline range scans well aligned. FIG. 1E shows the observed contours 132 extracted from the range scan data captured by camera-1 accurately aligned with the predicted contours 134 extracted from the projected range scan data captured by camera-2 in the first image plane 115 for camera-1. Likewise, FIG. 1F shows the observed contours 138 extracted from the range scan data captured by camera-2 accurately aligned with the predicted contours 136 extracted from the projected range scan data captured by camera-1. Note that the contour coherence is robust in the presence of wide baseline in the sense that only the shape area close to the predicted contour generator is considered when building correspondences on the contour, thus avoiding the search for correspondences over the entire shape.

Figure 2:
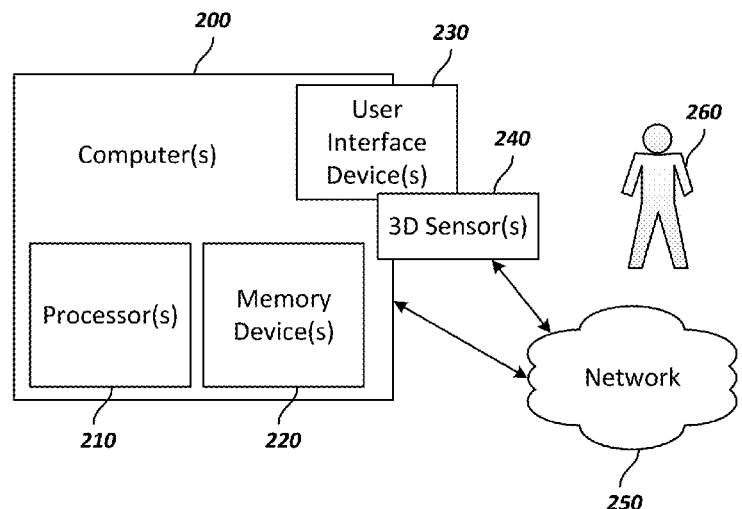
FIG. 2 is a block diagram showing an example of a system for registering frames of range scan data by maximizing contour coherence.

FIG. 2 is a block diagram showing an example of a system for registering frames of range scan data by maximizing contour coherence. One or more computers 200 each include processing electronics, such as one or more processors 210, and one or more memory devices 220 for holding computer instructions and data. Additional devices can also be included such as a long term storage device (e.g., a hard disk drive), a communication interface device (e.g., a wireless transceiver), and one or more user interface devices 230 (e.g., a display, a camera, a speaker, a microphone, a tactile feedback device, a keyboard, and a mouse). As used herein, a "computer-readable medium" refers to any physical, nontransitory medium (e.g., a magnetic medium in the hard disk drive or a semiconductor medium in a memory device 220) on which a computer program product can be encoded to cause data processing apparatus (e.g., a computer 200) to perform the operations described herein.

In some implementations, a 3D range sensor 240 is included in the system, and the range sensor data is actively captured for processing. For example, in a body scan implementation, the object that is scanned can be a person 260. Moreover, as will be appreciated, various levels of integration of components can be used in various implementations. For example, a sensor 240 can be integrated into a camera 230, which in turn can be integrated into the computer 200, or alternatively be separate therefrom. Moreover, the user interface device(s) 230 can be entirely separate from the computer(s) 200 that do the processing of range scan data to maximize contour coherence. For example, the 3D sensor 240 can be a PRIMESENSE™ Kinect camera (available from Microsoft Corporation of Redmond, Wash.) attached to home computer system 230 (e.g., a gaming and/or web access machine) that communicates with a server computer 200 through a network 250 (e.g., the Internet). Thus, in some implementations, the range sensor data is not actively captured, but rather is received from a third party source, processed, and then delivered to the desired recipient of the 3D model.

Low-cost structured light 3D sensors, such as found in the Kinect camera, can enable handy complete scanning of objects in the home environment. However, in such environments, it can be difficult to generate range scan data with small motion between consecutive views, which may be required by traditional methods for generating 3D reconstruction results of rigid or articulated objects. Using the systems and techniques described herein, less care need be taken to ensure the user moves the 3D sensor carefully around the object or turns the subject slowly in a controlled manner in order to achieve good 3D reconstruction results. Moreover, drifting error can be addressed, and the gaps visible with traditional techniques can be closed.

Figure 3:
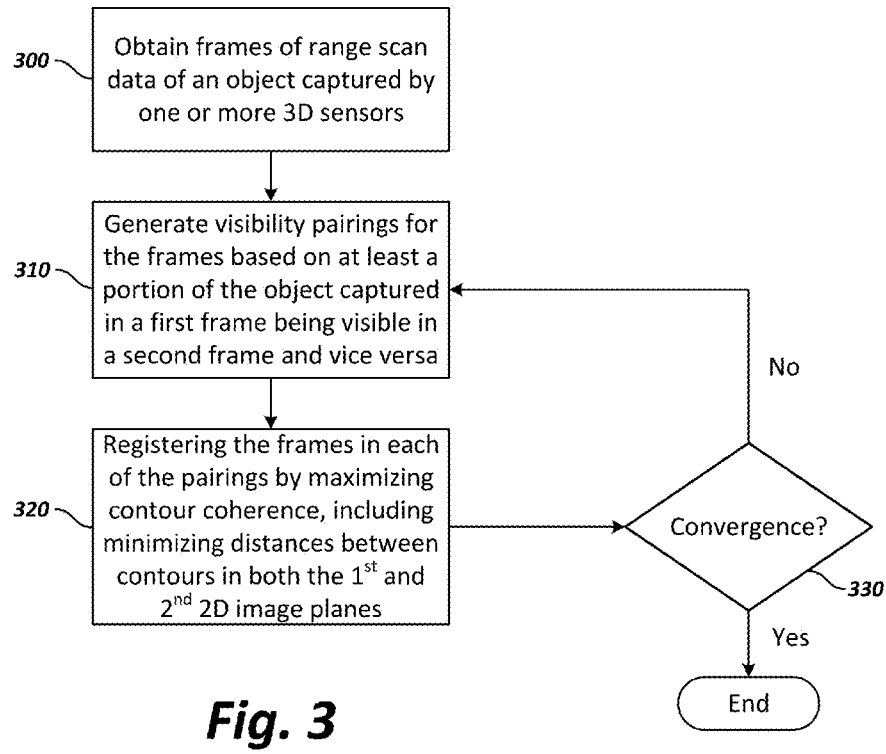
FIG. 3 is a flowchart showing an example of a process for registering frames of range scan data by maximizing contour coherence.

FIG. 3 is a flowchart showing an example of a process for registering frames of range scan data by maximizing contour coherence. Frames of range scan data are obtained 300. This can involve actually capturing the range scan data, using camera systems such as described above, or this can involve receiving range scan data that was previously captured by another. In any case, the range scan data is data that was captured using one or more 3D sensors (e.g., a Kinect camera), and the frames of the range scan correspond to different views of an object, regardless of whether taken by one camera or more than one camera.

Initial visibility pairings can be generated 310 for the frame, where a pairing of a first frame with a second frame indicates that at least a portion of the object represented in the second frame is visible in the first frame, and at least a portion of the object represented in the first frame is visible in the second frame. For example, each set of two frames that have their viewing directions within 120 degrees of each other can be paired. Other angles and approaches for generating the visibility pairings are also possible.

The frames in each of the pairings can then be registered 320 with each other by maximizing contour coherence of the range scan data for the object, including minimizing distance between contour correspondences for the first frame and the second frame of the pairing in a first two dimensional image plane of the first frame, and distance between contour correspondences for the second frame and the first frame of the pairing in a second two dimensional image plane of the second frame. Thus, contour coherence can be employed under a multi-view framework to develop a Multi-view Iterative Closest Contour (M-ICC) algorithm. Maximizing contour coherence, i.e., the agreement between the observed and predicted apparent contours can be used to perform wide basline range scan registration, where the M-ICC algorithm can alternate between finding closest contour correspondences and minimizing their distances.

A check can be made 330 for convergence, and until convergence is reached, the process can continue to iteratively update visibility pairings 310 for the frames and repeat the registration 320 until convergence is achieved. A stopping condition to identify convergence 330 for the iterative process can be: (1) the maximum iteration number has been achieved (e.g., a maximum of 50 iterations), or (2) the distance per contour correspondence is relatively small (e.g., 0.01 or less), or (3) the decrease in distance per contour correspondence is relatively small (e.g., 0.001 or less). Traditional techniques in gradient descent type optimization can be used. In practice, the algorithm will typically reach convergence within ten iterations. The registration 320 can employ a Robust Closest Contour (RCC) algorithm, which is described in detail below, to establish robust contour correspondences on each a pair of range scans, either in a rigid registration process, an articulated registration process, or both; and the cost function can be minimized with the Levenberg-Marquardt algorithm.

Figure 4:
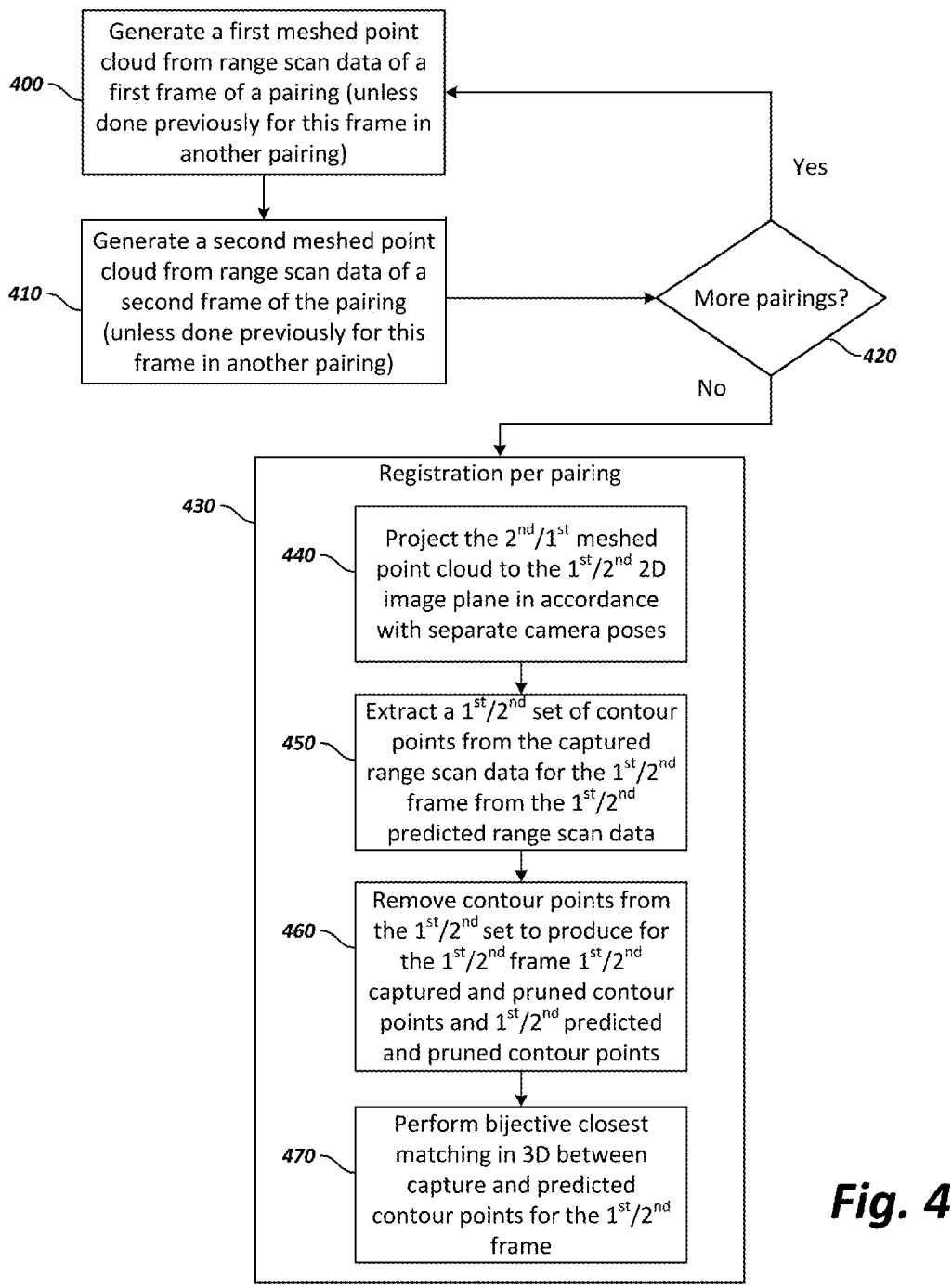
FIG. 4 is a flowchart showing an example of a process of rigid registration between range scan pairings.

FIG. 4 is a flowchart showing an example of a process of rigid registration between range scan pairings. A first meshed point cloud is generated 400 from the range scan data of a first frame of a pairing, and a second meshed point cloud is generated 410 from the range scan data of a second frame of the pairing. While there are more pairings 420 in the initial set of pairings, this process is repeated, but note that the mesh point cloud need only be created once for each frame of the range scan data, and since the initial pairings can overlap (i.e., frame 2 can be paired with both frame 1 and with frame 3) any previously generated meshed point cloud can be used for a frame in any of its pairings. In addition, in some implementations, the meshed point clouds are generated for the frames to be registered with each other before any pairings among the frames are made.

A 2.5D range scan Ri of frame i provides depth value $Ri(u)$ at each image pixel $u=(u,v)^T \in R^2$. A single constant camera calibration matrix K can be used, which transforms points from the camera frame to the image plane. We represent $Vi(u)=K^{-1}Ri(u)\tilde{u}$ as the back-projection operator which maps u in frame i to its 3D location, where $\tilde{u}$ denotes the homogeneous vector $\tilde{u}=[u^T|1]^T$. Inversely, we denote the projection operator as $P(Vi(u))=g(KVi(u))$ where g represents dehomogenisation.

A meshed points cloud Pi is generated for each frame i considering the connectivity on the range scan Ri. We calculate the normalized 3D normal at each pixel $Ni(u) \in R^3$, e.g., following the techniques described in R. A. Newcombe, et al. "Kinectfusion: Real-time dense surface mapping and tracking." In *ISMAR*, pages 127-136. IEEE, 2011. Ni(u) is further projected back to the image to obtain normalized 2D normal ni(u) of each image pixel.

Registration can be performed 430 between range scans for each pair of frames of range scan data. Thus, for a given pair (with first and second frames) the second meshed point cloud can be projected 440 to the first two dimensional image plane in accordance with camera pose information (e.g., a separate camera pose for each camera) to generate first predicted range scan data for the first frame, and the first meshed point cloud can be projected 440 to the second two dimensional image plane in accordance with the camera pose information to generate second predicted range scan data for the second frame. In general, projecting Pj to the ith image, given current camera poses, leads us to a projected range scan Rj→i. The inputs to the RCC algorithm are thus observed and predicted range scans, namely Ri and Rj→i, and the output is robust contour correspondences Mi,j→i (see equation 5 and equation 9 below).

Figure 5:
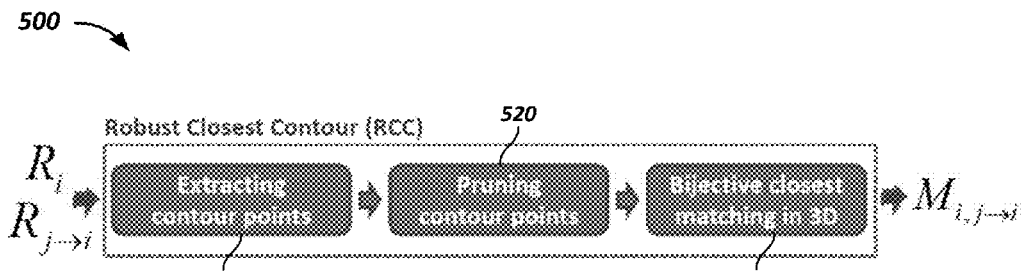
FIG. 5 shows a process pipeline for a Robust Closest Contour (RCC) algorithm.

FIG. 5 shows a process pipeline 500 for the RCC algorithm with these inputs and output. The RCC pipeline 500 includes extracting countour points 510, pruning contour points 520, and performing bijective closest matching 530. Referring again to FIG. 4, a first set of contour points can be extracted 450 from the captured range scan data for the first frame and from the first predicted range scan data for the first frame, and a second set of contour points can be extracted 450 from the captured range scan data for the second frame and from the second predicted range scan data for the second frame. Given pixels belonging to the object in frame i as $U_i$, we set $R_i(u)=\infty$ for $u \notin U_i$. The contour points Ci are extracted considering the depth discontinuity of a pixel and its 8-neighboring pixels, $$C_i = \{u \in U_i | \exists v \in N_u^8, R_i(v) - R_i(u) > \zeta\}, \quad (1)$$

where $\zeta$ is the depth threshold, which can be set as 50 mm. We can also extract a set of occlusion points, $$O_i = \{u \in U_i | \exists v \in N_u^8, R_i(u) - R_i(v) > \zeta\}, \quad (2)$$

which are boundary points of surface holes created by occlusion, and the depth threshold $\zeta$ can again be set as 50 mm.

Contour points can be removed 460 from the first set to produce first captured and pruned contour points and first predicted and pruned contour points for the first frame, and contour points can be removed 460 from the second set to produce second captured and pruned contour points and second predicted and pruned contour points for the second frame. Both $C_i$ and $C_{j \to i}$ should be pruned before the matching stage to avoid possible incorrect correspondences. First due to the self-occlusion of frame j, $C_{j \to i}$ contains false contour points which are actually generated by the meshes in $P_j$ connected with $C_j$ and $O_j$. We mark and remove them to generate the pruned contour points $C_{j \to i}^p$. Second again due to the self occlusion of frame j, some contour points in $C_i$ should not be matched with any contour point in $C_{j \to i}^p$, e.g., the contour points in frame 2 belonging to the back part of the object, which are not visible in view 1. Hence we prune $C_i$ based on the visibility of the corresponding contour generator in view j, $$C_{i/j}^p = \{u \in C_i | N_i(u)^T \cdot (o_{j \to i} - V_i(u)) > 0\}, \quad (3)$$

where $o_{j \to i}$ is the camera location of frame j in camera i.

Bijective closest matching can be performed 470 in three dimensions between the first captured and pruned contour points and the first predicted and pruned contour points for the first frame, and bijective closest matching can be performed 470 in three dimensions between the second captured and pruned contour points and the second predicted and pruned contour points for the second frame. After pruning, a one-way closest matching algorithm between $C_{i/j}^p$ and $C_{j \to i}^p$ still fails, as contour points are sensitive to minor changes in viewing directions, e.g., camera 1 observes only one leg of an object while the contour points of two legs of the object are extracted from the projected range scan. Hence a bijective matching scheme can be used (e.g., using the techniques described in M. Zeng, et al. "Templateless quasi-rigid shape modeling with implicit loop-closure." In CVPR, pages 145-152, 2013.) when establishing robust correspondences (see equation 5 and equation 9 below).

Matching directly in the 2D image space can lead to many wrong corresponding pairs. The ambiguity imposed by the 2D nature can be resolved by relaxing the search to the 3D, as we have the 3D point location $V_i(u)$ for each contour point. It is worth mentioning that while we build correspondences in 3D, we are minimizing the distances between contour correspondences in 2D, as the real data given by most structured-light 3D sensors is extremely noisy along the rays of apparent contour. Thus, point cloud registration is achieved for two frames using projected occluding boundaries of the range scan data of the two frames.

Note that lots of information is lost when working in 2D and so the correspondences cannot be found in 2D. Finding correspondence in 3D space will reduce the ambiguity of correspondences, but minimizing the distances should be done in the 2D image plane because the noise in the depth image on the countour points is large. Thus, trying to minimize the distances directly in 3D can cause substantial problems.

Figure 6:
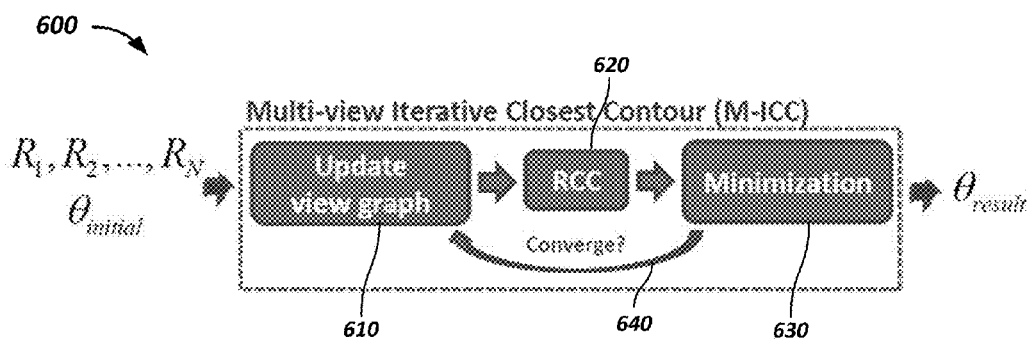
FIG. 6 shows a process pipeline for a Multi-view Iterative Closest Contour (M-ICC) algorithm.

FIG. 6 shows a process pipeline 600 for a Multi-view Iterative Closest Contour (M-ICC) algorithm. The M-ICC algorithm can be used to rigidly align all range scans at the same time. Given N roughly initialized range scans, the algorithm can alternate between updating 610 a view graph (visibility list), establishing 620 robust contour correspondences from pairs of range scans in the view graph (e.g., using the RCC algorithm), and minimizing 630 distances between all correspondences until convergence 640. While a traditional pairwise ICP algorithm fails in the presence of wide baseline, the present registration method recovers accurate camera poses.

Frame i is associated with a 6 DOF (degrees of freedom) rigid transformation matrix $$^wT_i = \begin{bmatrix} R_i & t_i \\ o^T & 1 \end{bmatrix}$$

where $R_i$ is parameterized by a 3 DOF quaternion, namely $q_i = [q_i^w, q_i^x, q_i^y, q_i^z]$ with $\|q\|_2 = 1$, and $t_i$ is the translation vector. Operator $^w\Pi_i(u) = {}^wT_i\tilde{V}_i(u)$ transforms pixel u to its corresponding homogeneous back-projected 3D point in the world coordinate system, where $^w\tilde{V}_i(u)$ is the homogenous back-projected 3D point in the camera coordinate system of fame i. Inversely, we have operator $^i\Pi_w$ such that $u = {}^i\Pi_w({}^w\Pi_i(u)) = P(g({}^iT_w {}^w\Pi_i(u)))$. Given N frames, we have a total 6×N of parameters stored in a vector θ.

Unlike other approaches, where pairwise registration is performed before a final global error diffusion step, we do not require pairwise registration and explicitly employ contour coherence under a multi-view framework. We achieve that by associating two camera poses with a single contour correspondence. Assuming u and v is a corresponding pair belonging to frame i and frame j respectively, then their distance is modeled as $\|v - {}^j\Pi_w({}^w\Pi_i(u))\|_2$. Minimizing this distance updates both camera poses at the same time, which allows us to globally align all frames together. It is worth mentioning that pairwise registration is a special case of our multi-view scenario in a way that the pairwise registration $^2T_1$ is achieved as $^2T_1 = {}^2T_w {}^wT_1$.

A view graph (or visibility list) L is a set of pairing relationships among all frames. (i,j)∈L indicates that frame j is visible in frame i and hence robust contour correspondences should be established between $R_i$ and $R_{j\to i}$. Each frame's viewing direction in the world coordinate is $R_i(0, 0, 1)^T$ and frame j is viewable in frame i only if their viewing directions are within a certain angle n, i.e., $$L=\{(i,j) | a \cos((0,0,1)R_i^T R_j(0,0,1)^T) < n\} \quad (4)$$

It is worth mentioning that (i,j)≠(j,i), and we establish two pairs of correspondences between frame i and frame j, namely between $C_{j\to i}^P$ and $C_{i/j}^P$, and between $C_{i\to j}^P$ and $C_{j/i}^P$.

Another issue worth raising is that the loop closure is automatically detected and achieved if all N views form a loop. For example, if L is calculated as {(1; 2); (2; 1); (2; 3); (3; 2); (1; 4); (4; 1)} from $\theta_{initial}$ with N=4, i.e., the gap between frame 3 and frame 4 is large and the loop is not closed from the beginning, then as we iterate and update the camera poses, link {(3; 4); (4; 3)} is added to L and we automatically close the loop. Thus, performing the registration process can involve globally aligning all the frames together in each iteration, and automatically detecting and achieving loop closure if a loop among all views is present.

For each viewable pair (i,j)∈L, robust contour correspondences $M_{i,j\to i}$ can be extracted between $C_{j\to i}^P$ and $C_{i/j}^P$ using the RCC algorithm as $$M_{i,j\to i}=\{(u, {}^j\Pi_w({}^w\Pi_i(v)))| \quad (5)$$

v=arg min d($V_i$(u),$V_{j\to i}$(m)),
m∈$C_{j\to i}^P$
u=arg min d($V_{j\to i}$(v),$V_i$(n))}
n∈$C_{i/j}^P$ where d(x,y)=$\|x-y\|_2$ is the Euclidean distance operator. Pixel v is the closest (i.e., distance in the back-projected 3D space) point on the pruned predicted contour to pixel u on the pruned observed contour, while at the same time pixel u is also the closest to pixel v, i.e., the bijectivity in 3D is imposed.

The minimization can be the sum of point-to-plane distances of all contour correspondences as $$\varepsilon_R = \sum_{(i,j)\in L} \sum_{(u,v)\in M_{i,j\to 1}} |(u - {}^i\Pi_w({}^w\Pi_j(v)))^T \cdot n_i(u)|. \quad (6)$$

In practice, we find that the point-to-plane error metric allows two contours sliding along each other and reaching better local optimum than the point-to-point error metric.

To handle articulations, the M-ICC algorithm can be extended to a Multi-view Articulated Iterative Closest Contour (MA-ICC) algorithm. For example, the M-ICC algorithm 600 can be applied to the frames of range scan data as initialization to roughly align the frames of range scan data, and then a further process of registration can be performed using segmentation and articulation.

Segmentation information can be obtained for range scan data in at least one frame, where the segmentation information locates all rigid parts in the at least one frame. This can involve receiving a known segmentation for a known frame, such as knowing that the first frame will include a person facing toward the camera with arms and legs spread. Alternatively, this can involve identifying one of the frames that most closely matches a segmentation template for the object scanned (e.g., a human body template composed of a head, a torso, two arms, a waist, two upper leg portions, and two lower leg portions), and then creating the segmentation information based on this template. Various segmentation algorithms can be used in various implementations, such as described in Shotton, Jamie, et al. "Real-time human pose recognition in parts from single depth images." Communications of the ACM 56.1 (2013): 116-124.

Range scan data in additional frames can be segmented in accordance with current alignments among the frames and the segmentation information for the range scan data in the at least one frame. Segmented visibility pairings can be generated for the segmented frames, where a segmented pairing of a first segmented frame with a second segmented frame indicates that (i) one of the rigid parts located in the second frame is visible in the first frame and (ii) one of the rigid parts located in the first frame is visible in the second frame. Segmented registration between each of the segmented visibility pairings can be performed by maximizing contour coherence of the range scan data for one or more rigid parts in each segmented pairing, including minimizing (i) distance between contour correspondences for the first segmented frame and the second segmented frame in a first two dimensional image plane of the first segmented frame and (ii) distance between contour correspondences for the second segmented frame and the first segmented frame in a second two dimensional image plane of the second segmented frame. Finally, the process of segmenting the range scan data in the additional frames, updating the segmented visibility pairings for the frames and performing the segmented registration can be iteratively repeated until convergence.

Figure 7:
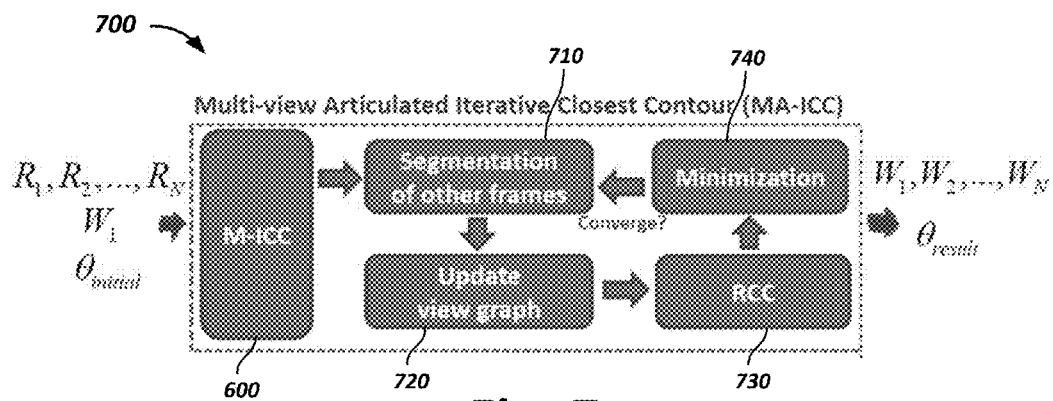
FIG. 7 shows a process pipeline for a Multi-view Articulated Iterative Closest Contour (MA-ICC) algorithm.

FIG. 7 shows a process pipeline 700 for a Multi-view Articulated Iterative Closest Contour (MA-ICC) algorithm. Given N range scans, articulation structure as well as known segmentation $W_1$ of all rigid parts in the first frame, all range scans can initially be regarded as rigid, and the M-ICC algorithm 600 can be applied to roughly align all the range scans. Then the MA-ICC algorithm iteratively segments 710 other frames, updates 720 the view graph, establishes 730 robust contour correspondences (e.g., using RCC) and minimizes 740 until convergence.

A standard hierarchical structure can be employed for the segmentation, where each rigid segment k of frame i has an attached local coordinate system related to the world coordinate system via transform ${}^wT_k^i$. This transformation is defined hierarchically by recurrence ${}^wT_k^i = {}^wT_{k_p}^i \, {}^{k_p}T_k^i$ where $k_p$ is the parent node of k. For the root node, we have ${}^wT_{root}^i = {}^wT_i$ where ${}^wT_i$ can be regarded as camera pose of frame i. ${}^{k_p}T_k^i$ has a parameterized rotation component and a translation component completely dependent on the rotation component. As such, for a total of N range scans where the complete articulated structure contains M rigid segments, there is a total number of N×(M×3+3) parameters stored in the vector θ.

A Linear Blend Skinning (LBS) scheme can be employed, where each pixel u in frame i is given a weight vector $W_i(u) \in \mathfrak{R}^M$ with $$\sum_{j=1\ldots M} W_i(u)_j = 1,$$

indicating its support from all rigid segments. As such, operator ${}^w\Pi_i$ in the rigid case is rewritten as $${}^w\Pi_i^A(u) = \sum_{j=1\ldots M} {}^wT_j^i \tilde{V}_i(u) W_i(u)_j$$

in the articulated case, which is a weighted transformation of all rigid segments attached to u. Similarly we have operator ${}^i\Pi_w^A$ as the inverse process such that $u={}^i\Pi_w^A({}^w\tilde{V}_i(u))$.

Given the segmentation $W_1$ of the first frame and predicted pose $\theta$, pixel $u \in U_i$ of frame i can be segmented as $$W_i(u) = W_1(\arg\min_v d(v, {}^1\Pi_w^A({}^w\Pi_1^A(u)))), \quad (7)$$
$$v \in u_1$$

i.e., the same weight as the closest pixel in the first frame. Further, to simplify the following discussion, we define $F(S,k)=\{u \in S | W_s(u)_k=1\}|$, which indicates the subset of S with pixels exclusively belonging to the k-th rigid part.

In the presence of articulation, contour correspondences need only be built on the corresponding rigid body parts, and as such, $(i,j,k) \in L^A$ indicates that rigid segment k of frame j is viewable in frame i, and robust contour correspondences should be built among $F(C_{i/j}^P,k)$. Besides considering the viewing direction of cameras, self-occlusion can be considered and contour correspondences can be built only when there are enough contour points (i.e., more than $\gamma$) belonging to the rigid segment k in both views, $$L^A = \{(i,j,k) | a \cos((0,0,1)R_i^T R_j(0,0,1)^T) < \eta,$$
$$\#(F(C_{i/j}^P,k)) > \gamma, \#(F(C_{j \to i}^P,k)) > \gamma|\} \quad (8)$$

In addition, for each viewable pair $(i,j,k) \in L^A$, the set of bijective contour correspondences $M_{i,j \to i,k}^A$ between $F(C_{i/j}^P,k)$ and $F(C_{j \to i}^P,k)$ can be extracted by RCC as $$M_{i,j \to i,k}^A = \{(u, {}^j\Pi_w^A(({}^w\Pi_i^A(v)))| \quad (9)$$

$v = \arg\min d(V_i(u), V_{j \to i}(m))$,
$m \in F(C_{j \to i}^P,k)$
$u = \arg\min d(V_i(n), V_{j \to i}^P,(v))\}$,
$n \in F(C_{i/j}^P,k)$ and the sum of point-to-plane distances can be minimized between all contour correspondences by $$\varepsilon_R = \sum_{(i,j,k) \in L^A} \sum_{(u,v) \in M_{i,j \to i,k}^A} |(u - {}^i\Pi_w^A({}^w\Pi_j^A(v)))^T \cdot n_i(u)| + \alpha \theta^T \cdot \theta, \quad (10)$$

where $\alpha \theta^T \cdot \theta$ is used as the regularization term favoring the small articulation assumption (i.e., the articulations introduced by subject's motion while the subject is trying to keep the same global pose during motion). Note that the magnitude of the additional term linearly increases as the angle of articulation increases.

As before, the stopping condition for the iterative process can be: (1) the maximum iteration number has been achieved, or (2) the distance per contour correspondence is relatively small, or (3) the decrease in distance per contour correspondence is relatively small. For each iteration, equation 6 and equation 10 are non-linear in parameters. As such, the Levenberg-Marquardt algorithm can be employed as the solver. In some implementations, the Jacobian matrix for the Levenberg-Marquardt algorithm is calculated by the chain rule.

The depth discontinuity threshold can be set as $\zeta = 50$ mm in equations 1 and 2. The viewable angle threshold can be set at $\eta = 120°$ in equations 4 and 8, while the rigid segment minimum number of points threshold can be set as $\gamma = 500$ in equation 8. The weight for regularizer can be set as $\alpha = 100$ in equation 10. However, it is worth mentioning that for most if not all range scanning devices (e.g., the Kinect sensor) the parameters work for a large range and do not require specific tuning In practice, the M-ICC and MA-ICC algorithms can converge within ten iterations. Specifically for rigid registration, within each iteration and for each pairing, two projections are performed, two sets of robust contour correspondences are extracted, and the cost function can be minimized with the Levenberg-Marquardt algorithm. Since the projection can be readily parallelized and the closest-point matching is searching over a limited number of contour points in 2D space, the algorithms described herein can readily run in real time on a GPU (Graphics Processing Unit).

When modeling rigid objects, four depth images of rigid objects can be captured at approximately 90° apart using a single Kinect sensor. The background depth pixels can be removed from the range scans by simply thresholding depth, detecting and removing planar pixels using RANSAC (see M. A. Fischler and R. C. Bolles. "Random sample consensus: a paradigm for model fitting with applications to image analysis and automated cartography." Communications of the ACM, 24(6):381-395, 1981.), assuming the object is the only thing on the ground or table. The four wide baseline range scans can be initialized by aligning the centers together and assuming a pairwise 90° rotation angle. The four frames can be registered using the M-ICC algorithm, and the Poisson Surface Reconstruction (PSR) algorithm (see M. Kazhdan, et al. "Poisson surface reconstruction." In Proceedings of the fourth Eurographics symposium on Geometry processing, 2006.) can be used to generate the final water-tight model.

In some implementations, the object can be placed on a turntable and rotated to generate the frames of range scan data. In some implementations, smooth 3D object models can be reconstructed from the scans using only four views of the real-world object. In some implementations, the human body is scanned by turning the subject in front of a fixed sensor while showing four key poses, i.e., front, left, back and right, in that order. In implementations that use a sensor with a limited field of view, such as the Kinect sensor, rather than have the subject stand far away from the sensor, which results in degredation of the input data quality, the subject can be asked to come closer to the sensor and stay rigid for five to ten seconds at each key pose while the sensor, controlled by a built-in motor, swipes up and down to scan the subject (e.g., using KinectFusion). The reconstructed partial 3D scene can be further projected back to generate a super-resolution range scan.

After acquiring 4 super-resolution range scans of the subject, these can be aligned using the MA-ICC algorithm. Segmentation of the first range scan can be performed by heuristically segmenting the bounding contour and then assigning the same weight to each pixel as of its closest bounding contour. In some implementations, the whole body can be segmented into nine parts (e.g., a head, a torso, two arms, a waist, two upper leg portions, and two lower leg portions). In other implementations, other segmentation algorithms can be applied as input, such as described in Shotton, Jamie, et al. "Real-time human pose recognition in parts from single depth images." Communications of the ACM 56.1 (2013): 116-124. After registration, PSR can be used again to generate the final watertight model. Thus, accurate and complete human body models can be generated from as few as four views with a single sensor.

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown only for the purpose of clarity in this description. No particular order may be required for these operations to achieve desirable results, and various operations can occur simultaneously or at least concurrently. In certain implementations, multitasking and parallel processing may be preferable.

The various implementations described above have been presented by way of example only, and not limitation. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, the principles, elements and features described may be employed in varied and numerous implementations, and various modifications may be made to the described embodiments without departing from the spirit and scope of the invention. Accordingly, other embodiments may be within the scope of the following claims.

What is claimed is:

1. A method performed by a computer system comprising processor electronics and at least one memory device, the method comprising:
    obtaining frames of range scan data captured using one or more three dimensional (3D) sensors, wherein the frames correspond to different views of an object or scene;
    registering point clouds for the frames with each other by maximizing coherence of projected occluding boundaries of the object or scene within the frames using an optimization algorithm with a cost function that computes pairwise or global contour correspondences, wherein the registering comprises
        generating visibility pairings for the frames, wherein a pairing of a first frame with a second frame indicates that (i) at least a portion of the object or scene represented in the second frame is visible in the first frame and (ii) at least a portion of the object or scene represented in the first frame is visible in the second frame,
        performing registration between frames in each of the visibility pairings by maximizing contour coherence of the range scan data for the object or scene, including minimizing (i) distance between contour correspondences for the first frame and the second frame of the pairing in a first two dimensional image plane of the first frame and (ii) distance between contour correspondences for the second frame and the first frame of the pairing in a second two dimensional image plane of the second frame, and
        iteratively updating the visibility pairings for the frames and repeating the registration until convergence, wherein performing the registration between frames comprises globally aligning all the frames together in each iteration, and automatically detecting and achieving loop closure if a loop among all views is present; and
    providing the registered point clouds for use in 3D modeling of the object or scene.

2. The method of claim 1, wherein a visibility pairing is generated for each set of two frames having their viewing directions within an angle of 120 degrees.

3. The method of claim 1, wherein iteratively generating the visibility pairings and performing the registration until convergence is a multi-view rigid registration method applied to the frames of range scan data as initialization to roughly align the frames of range scan data, and the method further comprises:
    obtaining segmentation information for range scan data in at least one frame, wherein the segmentation information locates all rigid parts in the at least one frame;
    segmenting range scan data in additional frames in accordance with current alignments among the frames and the segmentation information for the range scan data in the at least one frame;
    generating segmented visibility pairings for the segmented frames, wherein a segmented pairing of a first segmented frame with a second segmented frame indicates that (i) one of the rigid parts located in the second frame is visible in the first frame and (ii) one of the rigid parts located in the first frame is visible in the second frame;
    performing segmented registration between each of the segmented visibility pairings by maximizing contour coherence of the range scan data for one or more rigid parts in each segmented pairing, including minimizing (i) distance between contour correspondences for the first segmented frame and the second segmented frame in a first two dimensional image plane of the first segmented frame and (ii) distance between contour correspondences for the second segmented frame and the first segmented frame in a second two dimensional image plane of the second segmented frame; and
    iteratively segmenting the range scan data in the additional frames, updating the segmented visibility pairings for the frames and repeating the segmented registration until convergence.

4. The method of claim 1 comprising:
    generating a first meshed point cloud from the range scan data of the first frame; and
    generating a second meshed point cloud from the range scan data of the second frame;
    wherein performing the registration comprises
        projecting the second meshed point cloud to the first two dimensional image plane in accordance with camera pose information to generate first predicted range scan data for the first frame,
        projecting the first meshed point cloud to the second two dimensional image plane in accordance with the camera pose information to generate second predicted range scan data for the second frame,
        extracting a first set of contour points from the captured range scan data for the first frame and from the first predicted range scan data for the first frame,
        extracting a second set of contour points from the captured range scan data for the second frame and from the second predicted range scan data for the second frame, removing contour points from the first set to produce first captured and pruned contour points and first predicted and pruned contour points for the first frame, removing contour points from the second set to produce second captured and pruned contour points and second predicted and pruned contour points for the second frame, performing bijective closest matching in three dimensions between the first captured and pruned contour points and the first predicted and pruned contour points for the first frame, and performing bijective closest matching in three dimensions between the second captured and pruned contour points and the second predicted and pruned contour points for the second frame.

5. A computer program product, encoded on a computer-readable medium, operable to cause data processing apparatus to perform operations comprising:

obtaining frames of range scan data captured using one or more three dimensional (3D) sensors, wherein the frames correspond to different views of an object or scene;

generating visibility pairings for the frames, wherein a pairing of a first frame with a second frame indicates that (i) at least a portion of the object or scene represented in the second frame is visible in the first frame and (ii) at least a portion of the object or scene represented in the first frame is visible in the second frame;

performing registration between frames in each of the visibility pairings by maximizing contour coherence of the range scan data for the object or scene, including minimizing (i) distance between contour correspondences for the first frame and the second frame of the pairing in a first two dimensional image plane of the first frame and (ii) distance between contour correspondences for the second frame and the first frame of the pairing in a second two dimensional image plane of the second frame; and iteratively updating the visibility pairings for the frames and repeating the registration until convergence;

wherein performing the registration between frames comprises globally aligning all the frames together in each iteration, and automatically detecting and achieving loop closure if a loop among all views is present.

6. The computer program product of claim 5, wherein a visibility pairing is generated for each set of two frames having their viewing directions within an angle of 120 degrees.

7. A computer program product, encoded on a computer-readable medium, operable to cause data processing apparatus to perform operations comprising:

obtaining frames of range scan data captured using one or more three dimensional (3D) sensors, wherein the frames correspond to different views of an object or scene;

generating visibility pairings for the frames, wherein a pairing of a first frame with a second frame indicates that (i) at least a portion of the object or scene represented in the second frame is visible in the first frame and (ii) at least a portion of the object or scene represented in the first frame is visible in the second frame;

performing registration between frames in each of the visibility pairings by maximizing contour coherence of the range scan data for the object or scene, including minimizing (i) distance between contour correspondences for the first frame and the second frame of the pairing in a first two dimensional image plane of the first frame and (ii) distance between contour correspondences for the second frame and the first frame of the pairing in a second two dimensional image plane of the second frame; and iteratively updating the visibility pairings for the frames and repeating the registration until convergence;

wherein iteratively generating the visibility pairings and performing the registration until convergence is a multi-view rigid registration method applied to the frames of range scan data as initialization to roughly align the frames of range scan data, and the operations further comprise:

obtaining segmentation information for range scan data in at least one frame, wherein the segmentation information locates all rigid parts in the at least one frame;

segmenting range scan data in additional frames in accordance with current alignments among the frames and the segmentation information for the range scan data in the at least one frame;

generating segmented visibility pairings for the segmented frames, wherein a segmented pairing of a first segmented frame with a second segmented frame indicates that (i) one of the rigid parts located in the second frame is visible in the first frame and (ii) one of the rigid parts located in the first frame is visible in the second frame;

performing segmented registration between each of the segmented visibility pairings by maximizing contour coherence of the range scan data for one or more rigid parts in each segmented pairing, including minimizing (i) distance between contour correspondences for the first segmented frame and the second segmented frame in a first two dimensional image plane of the first segmented frame and (ii) distance between contour correspondences for the second segmented frame and the first segmented frame in a second two dimensional image plane of the second segmented frame; and iteratively segmenting the range scan data in the additional frames, updating the segmented visibility pairings for the frames and repeating the segmented registration until convergence.

8. The computer program product of claim 7, wherein a visibility pairing is generated for each set of two frames having their viewing directions within an angle of 120 degrees.

9. The computer program product of claim 7, wherein performing the registration between frames comprises globally aligning all the frames together in each iteration, and automatically detecting and achieving loop closure if a loop among all views is present.

10. The computer program product of claim 7, wherein the operations comprise:

generating a first meshed point cloud from the range scan data of the first frame; and generating a second meshed point cloud from the range scan data of the second frame;

wherein performing the registration comprises projecting the second meshed point cloud to the first two dimensional image plane in accordance with camera pose information to generate first predicted range scan data for the first frame, projecting the first meshed point cloud to the second two dimensional image plane in accordance with the camera pose information to generate second predicted range scan data for the second frame,
extracting a first set of contour points from the captured range scan data for the first frame and from the first predicted range scan data for the first frame,
extracting a second set of contour points from the captured range scan data for the second frame and from the second predicted range scan data for the second frame,
removing contour points from the first set to produce first captured and pruned contour points and first predicted and pruned contour points for the first frame,
removing contour points from the second set to produce second captured and pruned contour points and second predicted and pruned contour points for the second frame,
performing bijective closest matching in three dimensions between the first captured and pruned contour points and the first predicted and pruned contour points for the first frame, and
performing bijective closest matching in three dimensions between the second captured and pruned contour points and the second predicted and pruned contour points for the second frame.

11. A computer program product, encoded on a computer-readable medium, operable to cause data processing apparatus to perform operations comprising:
obtaining frames of range scan data captured using one or more three dimensional (3D) sensors, wherein the frames correspond to different views of an object or scene;
generating visibility pairings for the frames, wherein a pairing of a first frame with a second frame indicates that (i) at least a portion of the object or scene represented in the second frame is visible in the first frame and (ii) at least a portion of the object or scene represented in the first frame is visible in the second frame;
performing registration between frames in each of the visibility pairings by maximizing contour coherence of the range scan data for the object or scene, including minimizing (i) distance between contour correspondences for the first frame and the second frame of the pairing in a first two dimensional image plane of the first frame and (ii) distance between contour correspondences for the second frame and the first frame of the pairing in a second two dimensional image plane of the second frame; and
iteratively updating the visibility pairings for the frames and repeating the registration until convergence;
wherein the operations comprise:
generating a first meshed point cloud from the range scan data of the first frame; and
generating a second meshed point cloud from the range scan data of the second frame;
wherein performing the registration comprises
projecting the second meshed point cloud to the first two dimensional image plane in accordance with camera pose information to generate first predicted range scan data for the first frame,
projecting the first meshed point cloud to the second two dimensional image plane in accordance with the camera pose information to generate second predicted range scan data for the second frame,
extracting a first set of contour points from the captured range scan data for the first frame and from the first predicted range scan data for the first frame,
extracting a second set of contour points from the captured range scan data for the second frame and from the second predicted range scan data for the second frame,
removing contour points from the first set to produce first captured and pruned contour points and first predicted and pruned contour points for the first frame,
removing contour points from the second set to produce second captured and pruned contour points and second predicted and pruned contour points for the second frame,
performing bijective closest matching in three dimensions between the first captured and pruned contour points and the first predicted and pruned contour points for the first frame, and
performing bijective closest matching in three dimensions between the second captured and pruned contour points and the second predicted and pruned contour points for the second frame.

12. The computer program product of claim 11, wherein a visibility pairing is generated for each set of two frames having their viewing directions within an angle of 120 degrees.

13. The computer program product of claim 11, wherein performing the registration between frames comprises globally aligning all the frames together in each iteration, and automatically detecting and achieving loop closure if a loop among all views is present.

14. The computer program product of claim 11, wherein iteratively generating the visibility pairings and performing the registration until convergence is a multi-view rigid registration method applied to the frames of range scan data as initialization to roughly align the frames of range scan data, and the operations further comprise:
obtaining segmentation information for range scan data in at least one frame, wherein the segmentation information locates all rigid parts in the at least one frame;
segmenting range scan data in additional frames in accordance with current alignments among the frames and the segmentation information for the range scan data in the at least one frame;
generating segmented visibility pairings for the segmented frames, wherein a segmented pairing of a first segmented frame with a second segmented frame indicates that (i) one of the rigid parts located in the second frame is visible in the first frame and (ii) one of the rigid parts located in the first frame is visible in the second frame;
performing segmented registration between each of the segmented visibility pairings by maximizing contour coherence of the range scan data for one or more rigid parts in each segmented pairing, including minimizing (i) distance between contour correspondences for the first segmented frame and the second segmented frame in a first two dimensional image plane of the first segmented frame and (ii) distance between contour correspondences for the second segmented frame and the first segmented frame in a second two dimensional image plane of the second segmented frame; and
iteratively segmenting the range scan data in the additional frames, updating the segmented visibility pairings for the frames and repeating the segmented registration until convergence.

15. A system comprising:
a user interface device;
one or more three dimensional (3D) sensors; and
one or more computers operable to interact with the user interface device and the one or more 3D sensors, the one or more computers comprising at least one processor and at least one memory device, and the one or more computers programmed to (i) capture frames of range scan data using one or more three dimensional (3D) sensors, wherein the frames correspond to different views of an object or scene, (ii) generate visibility pairings for the frames, wherein a pairing of a first frame with a second frame indicates that (a) at least a portion of the object or scene represented in the second frame is visible in the first frame and (b) at least a portion of the object or scene represented in the first frame is visible in the second frame, (iii) perform registration between frames in each of the visibility pairings by maximizing contour coherence of the range scan data for the object or scene, including minimizing (a) distance between contour correspondences for the first frame and the second frame of the pairing in a first two dimensional image plane of the first frame and (b) distance between contour correspondences for the second frame and the first frame of the pairing in a second two dimensional image plane of the second frame, and (iv) iteratively update the visibility pairings for the frames and repeat the registration until convergence, wherein the one or more computers are programmed to perform the registration between frames by globally aligning all the frames together in each iteration, and automatically detecting and achieving loop closure if a loop among all views is present.

16. The system of claim 15, wherein a visibility pairing is generated for each set of two frames having their viewing directions within an angle of 120 degrees.

17. The system of claim 15, wherein the one or more computers are programmed to:
obtain segmentation information for range scan data in at least one frame, wherein the segmentation information locates all rigid parts in the at least one frame;
segment range scan data in additional frames in accordance with current alignments among the frames and the segmentation information for the range scan data in the at least one frame;
generate segmented visibility pairings for the segmented frames, wherein a segmented pairing of a first segmented frame with a second segmented frame indicates that (i) one of the rigid parts located in the second frame is visible in the first frame and (ii) one of the rigid parts located in the first frame is visible in the second frame;
perform segmented registration between each of the segmented visibility pairings by maximizing contour coherence of the range scan data for one or more rigid parts in each segmented pairing, including minimizing (i) distance between contour correspondences for the first segmented frame and the second segmented frame in a first two dimensional image plane of the first segmented frame and (ii) distance between contour correspondences for the second segmented frame and the first segmented frame in a second two dimensional image plane of the second segmented frame; and
iteratively segment the range scan data in the additional frames, update the segmented visibility pairings for the frames and repeat the segmented registration until convergence.

18. The system of claim 15, wherein the one or more computers are programmed to generate a first meshed point cloud from the range scan data of the first frame, generate a second meshed point cloud from the range scan data of the second frame, and perform the registration by:
projecting the second meshed point cloud to the first two dimensional image plane in accordance with camera pose information to generate first predicted range scan data for the first frame,
projecting the first meshed point cloud to the second two dimensional image plane in accordance with the camera pose information to generate second predicted range scan data for the second frame,
extracting a first set of contour points from the captured range scan data for the first frame and from the first predicted range scan data for the first frame,
extracting a second set of contour points from the captured range scan data for the second frame and from the second predicted range scan data for the second frame,
removing contour points from the first set to produce first captured and pruned contour points and first predicted and pruned contour points for the first frame,
removing contour points from the second set to produce second captured and pruned contour points and second predicted and pruned contour points for the second frame,
performing bijective closest matching in three dimensions between the first captured and pruned contour points and the first predicted and pruned contour points for the first frame, and
performing bijective closest matching in three dimensions between the second captured and pruned contour points and the second predicted and pruned contour points for the second frame.

19. The system of claim 15, wherein the one or more computers comprise a server operable to interact with the user interface device through a data communication network, and the user interface device is operable to interact with the server as a client.

20. The system of claim 15, wherein the one or more computers comprise one personal computer, and the personal computer comprises the user interface device.

* * * * *